(12) United States Patent
Katou

(10) Patent No.: US 8,507,074 B2
(45) Date of Patent: Aug. 13, 2013

(54) FOAMED MOLDING WITH SOFT INSERT COMPONENT AND ITS MOLDING METHOD

(75) Inventor: Shigeyuki Katou, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 421 days.

(21) Appl. No.: 12/310,537

(22) PCT Filed: Mar. 27, 2008

(86) PCT No.: PCT/JP2008/055941
§ 371 (c)(1),
(2), (4) Date: Feb. 27, 2009

(87) PCT Pub. No.: WO2008/120689
PCT Pub. Date: Oct. 9, 2008

(65) Prior Publication Data
US 2010/0189989 A1 Jul. 29, 2010

(30) Foreign Application Priority Data

Mar. 29, 2007 (JP) .................................. 2007-086407

(51) Int. Cl.
*B32B 3/06* (2006.01)
*B60J 5/00* (2006.01)

(52) U.S. Cl.
USPC ..................... 428/189; 428/319.3; 428/319.7; 428/174; 296/146.7; 296/39.1; 296/1.08

(58) Field of Classification Search
USPC ................ 428/309.9, 319.3, 319.7, 189, 174; 296/146.7, 39.1, 1.08
See application file for complete search history.

(56) References Cited

U.S. PATENT DOCUMENTS

| 4,350,544 A | 9/1982 | Matsuno |
| 5,133,912 A | 7/1992 | Hagiwara et al. |
| 5,486,329 A * | 1/1996 | Ueki et al. ..................... 264/273 |
| 2007/0029829 A1* | 2/2007 | Johnson et al. .............. 296/1.08 |

FOREIGN PATENT DOCUMENTS

| DE | 36 41 472 | 6/1988 |
| DE | 44 44 455 | 2/1996 |
| EP | 0 543 066 | 5/1993 |
| JP | 62-253413 | 11/1987 |
| JP | 1-139226 | 5/1989 |
| JP | 1-226312 | 9/1989 |
| JP | 3-69287 | 10/1991 |

OTHER PUBLICATIONS

Translation of DE 44 44 455, Feb. 15, 1996.*
International Search Report issued May 13, 2008 in the International (PCT) Application of which the present application is the U.S. National Stage.
Supplementary European Search Report issued Jun. 11, 2010 in EP 08 73 9070.

* cited by examiner

*Primary Examiner* — Hai Vo
(74) *Attorney, Agent, or Firm* — Wenderoth, Lind & Ponack, L.L.P.

(57) ABSTRACT

A soft insert component having a rigid body portion in the vicinity of a marginal part of one surface side is insert molded in integration to a foamed molding. The foamed molding with the soft insert component includes a triple layered structure having a skin material, a core material, and a foamed layer. The skin material includes an insert component fixing portion onto which the soft insert component can be fixed. The core material includes a rigid body-supporting portion able to support the rigid body portion while resisting against a compression force applied to the soft insert component during foam molding, and the foamed layer is formed between the core material and a skin layer formed of the skin material and the soft insert component.

6 Claims, 16 Drawing Sheets

FOAMED MOLDING WITH SOFT INSERT COMPONENT AND ITS MOLDING METHOD

TECHNICAL FIELD

The present invention relates to a foamed molding with a soft insert component and a molding method thereof.

BACKGROUND ART

A foamed molding is used in a vehicle, that is, an automobile or the like, in particular, inside a vehicle room or the like. As such a foamed molding, there is a part in which a soft insert component is embedded (for example, refer to Examined Japanese Patent Publication No. Hei-03-69287).

For example, in the case illustrated in FIG. 11, a foamed molding 4 having a triple layered structure including a skin material 1, a core material 2 and a foamed layer 3 is provided. In addition, a soft insert component 8 or the like having a triple layered structure including at least a skin material 5, a soft material layer 6 and a core material 7 is provided separately. Meanwhile, the soft insert component 8 can include a four layered structure in which a barrier layer 9 (backing film) is disposed between the soft material layer 6 and the core material 7.

The soft insert component 8 is fitted from a side of the core material 2 into a through hole 11 previously formed in the foamed molding 4, and a flange 13 provided on the core material 7 is fastened and fixed by a screw 14 to a boss section 12 provided on a lower surface of the core material 2, with the skin material 1 and the skin material 5 being maintained to a mutually approximately same level. By using a jig 15 for caulking use, the boss section 12 is caulked as illustrated in FIG. 12 so that the foamed molding 4 and the soft insert component 8 can be integrated (a separate type, a passing-through mounting type).

In addition, in the case illustrated in FIG. 13, a recess 16 is preliminarily formed on a side of the skin material 1 of the foamed molding 4. The soft insert component 8 is fitted from the side of the skin material 1 into the recess 16. Under a state in which the skin material 1 and the skin material mutually 5 maintain approximately the same level, a screw 14 is fastened to a boss section 18 disposed on the core material 7 via a small hole 17 disposed on a reverse surface side of the core material 2. In addition, an end part of the boss section 18 formed rather long can, for example, be caulked using a jig 15 for caulking use so that as illustrated in FIG. 14, the foamed molding 4 and the soft insert component 8 can be fixed in integration (a type with separate bodies and a fitting section, that is, the recess 16, for fixing).

However, in the above described types, the soft insert component 8 is fixed by the screw 14 or caulked by the jig 15 for caulking use against the foamed molding 4 so that increase in the number of parts and increase in man-hours are generated. Therefore, increased cost becomes problematic. In addition, in the case of FIG. 14, the core material 2 of the foamed molding 4 and the core material 7 of the soft insert component structurally overlap so that such needlessness in structure becomes problematic.

Therefore, consideration is given to a foamed molding 34 with a soft insert component, as illustrated in FIG. 15, including a double layered structure having at least a skin material 21 and a soft material layer 22. The foamed molding 34 also includes a soft insert component 24 having only in a vicinity of a marginal part of its lower surface side a rigid body portion. The foamed molding 34 also includes a core material 27 and a skin material 26 having an insert component fixing portion 25 to which the soft insert component 24 can be fixed. The soft insert component 24 along the skin material 26 and the core material 27 are set to a foam molding mold 28 under a state in which the soft insert component 24 is fixed to the insert component fixing portion 25 with a mutually approximately aligned surface formed between the two members. Foaming agent 32 (chemical) is infused from an infusion opening 31 disposed on the foam molding mold 28 into a foaming space 29 shaped between the core material 27, the skin material 26 and the soft insert component 24. As illustrated in FIG. 16, foam formation of the foaming agent 32 is performed at the foaming space 29 so that a foamed layer 33 is formed. Therefore, molding of the foamed molding 34 with the soft insert component as illustrated in FIG. 17 is considered. In addition, the soft insert component 24, although not particularly illustrated, can be shaped to have a triple layered structure having a barrier layer (backing film) on a reverse surface side of the soft material layer 22.

However, in the above described molding method of the foamed molding 34 with the soft insert component, as illustrated in FIG. 16, the soft insert component 24 gets compacted because it is weaker than a foam pressure of the foaming agent 32. In addition, the shape of the insert component fixing portion 25 of the skin material 26 to fix the soft insert component 24 does not match the shape of the soft insert component 24 so that spaces are generated between the two. Therefore, as illustrated in FIG. 18, a stick out part of the foamed layer 33 from the space generated (stick out part 35) becomes problematic.

In addition, when the foamed molding 34 with the soft insert component is released from the foam molding mold 28 and opened, as illustrated in FIG. 18, the soft insert component 24 crushed due to the foam pressure restores and bloats out towards a surface side (bloated part 36) so that the same level as the skin material 26 is not maintained. Thus, there is a problem that a product of bad external fitting qualities is obtained. An object of the present invention is to provide a foamed molding with a soft insert component and a molding method thereof having good external fitting qualities in which no sticking out portion of the foamed layer is generated and an approximately aligned surface is maintained between the skin material and the soft insert component.

SUMMARY OF THE INVENTION

In order to accomplish the above object, a foamed molding with a soft insert component according to an embodiment of the present invention includes a foamed molding and a soft insert component having a rigid body portion in a vicinity of a marginal part of one surface side in which the soft insert component is insert molded in integration to the foamed molding. The foamed molding includes a triple layered structure having a skin material, a core material and a foamed layer. The skin material includes an insert component fixing portion onto which the soft insert component can be fixed. The core material includes a rigid body-supporting portion for supporting the rigid body portion while resisting against a compression force applied to the soft insert component during foam molding. The foamed layer is formed between the core material, the skin material and the soft insert component.

Hereby, a groove part for insertion use is disposed at the rigid body portion of the soft insert component. A marginal part of the skin material can be inserted into the groove part for insertion use. The rigid body-supporting portion of the core material includes a skin material holding section that can hold the skin material inserted into the groove part.

A foamed molding with a soft insert component according to another embodiment of the present invention includes a soft insert component having, in the vicinity of a marginal part of its reverse surface side, a rigid body portion, a skin material having a insert component fixing portion to which the soft insert component can be fixed, and a core material having a rigid body-supporting portion for supporting the rigid body portion while resisting against a compression force applied to the soft insert component. A molding method of the foamed molding with the soft insert component according to the another embodiment of the present invention includes a mold fastening step that fastens a mold by setting the soft insert component, the skin material and the core material to a foam molding mold under a state in which the rigid body portion is supported by the rigid body-supporting portion and the soft insert component is fixed to the insert component fixing portion for fixing on the soft insert component with a mutually approximately aligned surface formed between the two members. A compression step compresses a slide mold disposed on the foam molding mold and compresses till the soft insert component with its rigid body portion supported by the rigid body-supporting portion reaches a thickness almost crushed by a foam pressure of a foaming agent. A foaming step generates a foamed layer by infusing the foaming agent into a foaming space formed between the core material, the skin material and the soft insert component, and a mold release step withdraws the slide mold after the foamed layer is hardened, and mold releases the slide mold to restore the crushed soft insert component so that the foamed molding with the soft insert component can be molded.

The compression step is performed before infusing the foaming agent in the foaming step.

The compression step is performed at a beginning of infusing the foaming agent in the foaming step or during infusion of the foaming agent.

The compression step is performed after finishing the infusion of the foaming agent in the foaming step until foam formation of the foaming agent is completed.

DETAILED DESCRIPTION OF THE INVENTION

A best mode for carrying out the invention and an embodiment specifying the best mode are described in detail with reference to the accompanying drawings hereinbelow.

Embodiment of the Invention

FIG. 1 through FIG. 10 illustrate an embodiment of the present invention.

A foamed molding is used in a vehicle, that is, an automobile or the like, in particular, inside a vehicle room or the like. As such a foamed molding, there is a part or the like in which a soft insert component is embedded.

The foamed molding with the soft insert component of the present embodiment includes the following constitutions.

Figure 1:
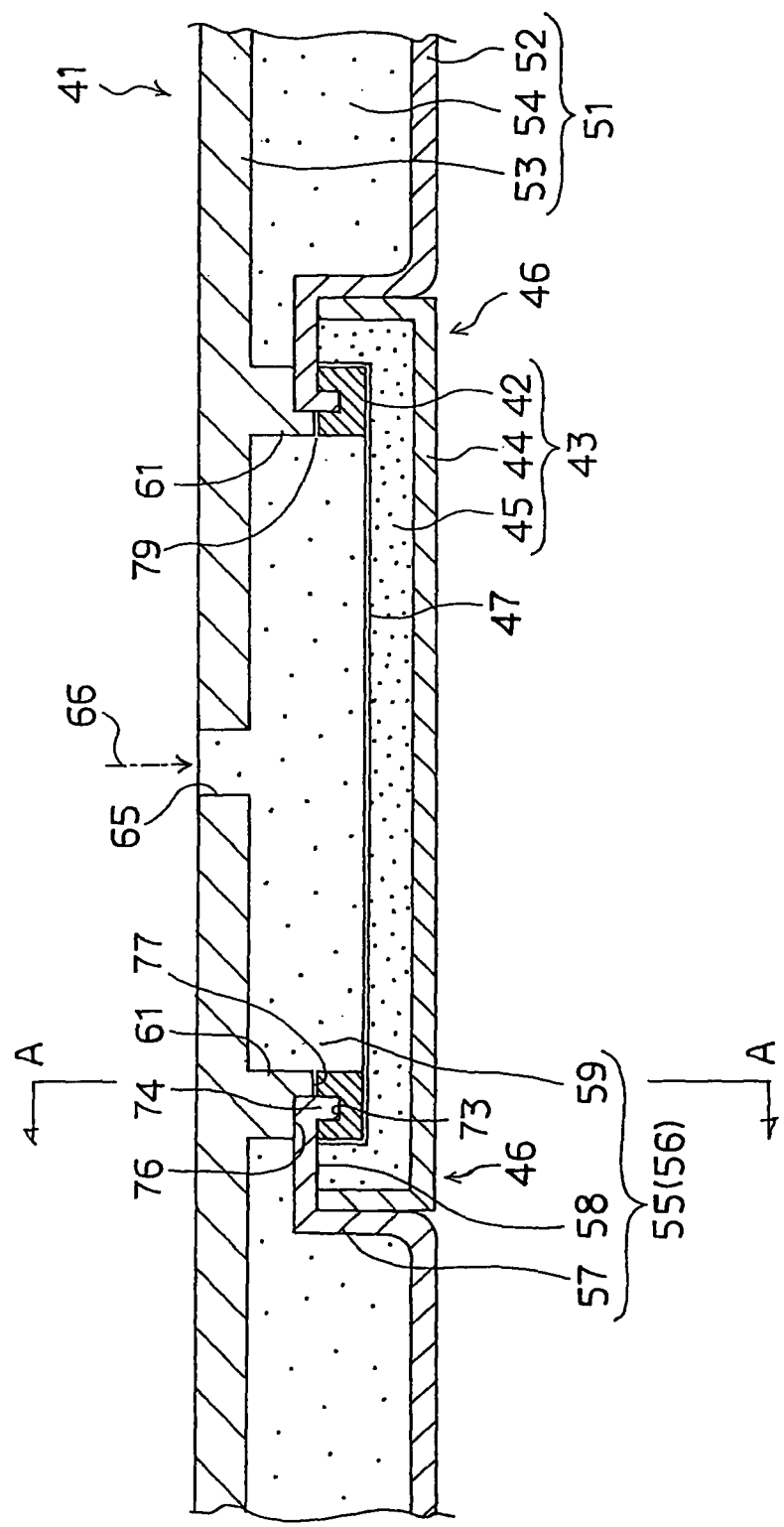
FIG. 1 is a cross sectional diagram that illustrates a foamed molding with a soft insert component according to an embodiment of the present invention with its surface pointed below.

As illustrated in FIG. 1, the foamed molding 41 with the soft insert component includes a soft insert component 43 having a rigid body portion 42 in one surface, for example, in a vicinity of a marginal part of its reverse surface side.

In this case, the soft insert component 43 includes at least a double layered structure having a skin material part 44 and a soft material layer 45. For the skin material part 44, pure hide, leather and cloth or the like are for example used. For the soft material layer 45, PPU and PU (semi-hard urethane, flexible urethane) or the like are for example used. For the rigid body portion 42, (PC) ABS and PPC or the like are for example used. In addition, the soft insert component 43 can include a triple layered structure or the like having a barrier layer 47 (backing film) on a reverse surface side of the soft material layer 45 (there are cases in which the barrier layer 47 is abbreviated for illustration). A marginal part of the soft insert component 43 maintains a double layered structure but is bent approximately perpendicularly towards its reverse surface side (bent marginal part 46). The rigid body portion 42 is disposed only in the vicinity of the marginal part of the reverse surface side of the soft insert component 43. The rigid body portion 42 is extended consecutively across a whole circumference along the marginal part of the soft insert component 43 to present a frame shape. More specifically, the rigid body portion 42 is fixed onto a general part on a reverse surface side of the soft material layer 45 and a corner part of the bent marginal part 46.

The soft insert component 43 is prepared preliminarily and insert molded in integration to a foamed molding body portion 51.

The foamed molding body portion 51 includes a triple layered structure having a skin material part 52, a core material 53 and a foamed layer 54. For the skin material part 52, TPU, TPO and PVC or the like are for example used. For the core material 53, PPC and ABS or the like are for example used. For the foamed layer 54, PU (urethane foam) or the like is used.

The skin material part 52 includes an insert component fixing portion 55 onto which the soft insert component 43 can be fixed. Hereby, the skin material part 52 can be the same as or different than the skin material part 44 of the soft insert component 43. As illustrated in FIG. 1, the skin material part 44 of the soft insert component 43 is substantially parallel (and co-planar) with the skin material part 52 of the foamed molding body portion 51.

The insert component fixing portion 55 is actually a holding recess 56 that can hold the soft insert component 43 under a state with an approximately aligned surface (with respect to skin material 52). The holding recess 56 has approximately the same shape as the soft insert component 43 so that the soft insert component 43 can be fitted to the holding recess 56 in a state with little or no space therebetween. That is, the holding recess 56 includes a level-difference part 57 that corresponds to a side surface of the bent marginal part 46 of the soft insert component 43 and a level surface part 58 disposed to correspond to an end surface of the bent marginal part 46 and at least a partial portion of the rigid body portion 42. In other words, a skin layer is formed of the skin material 52 and the soft insert component 43. In the level surface part 58, an opening part 59 able to look over a general part of the soft insert component 43 (central part of the reverse surface side of the soft material layer 45) is formed.

In addition, the core material 53 includes a rigid body-supporting portion 61 that can support the rigid body portion 42 while resisting against a compression force (and a restoration force of the compressed soft insert component 43) applied to the soft insert component 43 during foam molding. As shown in FIG. 1, the rigid body-supporting portion 61 supports the engagement (area of engagement) between rigid body portion 42 and the skin material part 52 of the foamed molding body portion 51.

Hereby the core material 53 is disposed at a reverse surface side of the foamed layer 54 with respect to the skin material 52 and approximately parallel to the skin material 52 with a mutual interval broader than the thickness of the soft insert component 43 (bent length of the bent marginal part 46). The rigid body-supporting portion 61 protrudes from an inner surface side of the core material 53 towards a position corresponding to the frame shaped rigid body portion 42 corresponding to the rigid body portion 42. The rigid body-supporting portion 61 supports the rigid body portion 42 in a thickness direction of the foamed molding 51. That is, the rigid body-supporting portion 61 supports and constrains the rigid body portion 42 so that the rigid body portion 42 does not move (movements under close proximity) towards the side of the core material 53 during molding from a set position in the insert component fixing portion 55.

Figure 2:
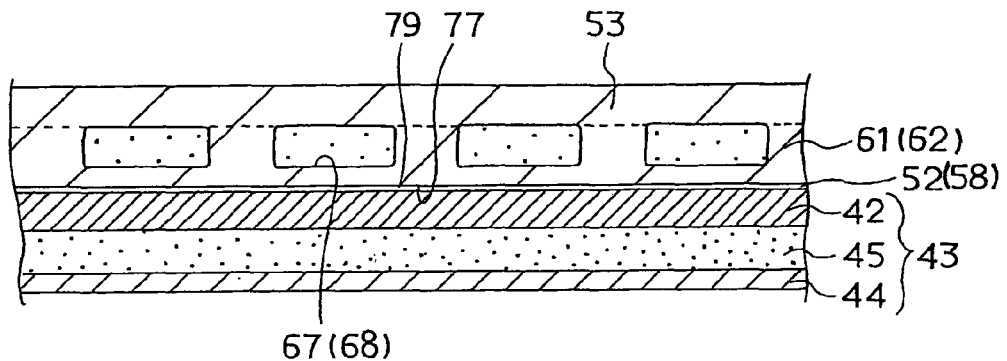
FIG. 2 is a cross sectional diagram that illustrates a rigid body portion and a rigid body-supporting portion of FIG. 1 in the form of a wall shaped support part.
Figure 3:
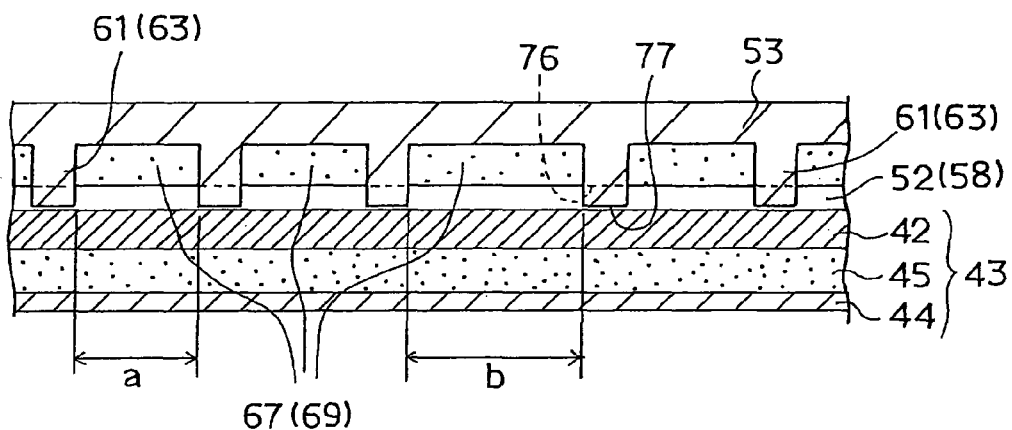
FIG. 3 is a cross sectional diagram that illustrates the rigid body portion and the rigid body-supporting portion of FIG. 1 in the form of a column shaped support part.

The rigid body-supporting portion 61, as illustrated in FIG. 2, can be consecutively wall shaped along the rigid body portion 42 (wall shaped support part 62). In addition, the rigid body-supporting portion 61, as illustrated in FIG. 3, can be column shaped (column shaped support part 63) in which a plurality of columns are arrayed at a predetermined interval along the rigid body portion 42.

In addition, as illustrated in FIG. 1, an opening 65 for infusion use is disposed on the core material 53 for infusing a foaming agent 66 (chemical) during molding. In this case, the opening 65 is disposed in a part internal to an area encircled by the rigid body-supporting portion 61 (for example, a central part in particular). In relation, a part 67 (refer to FIG. 2 and FIG. 3) that allows the foaming agent 66 to pass through to external parts of the above described area becomes necessary in the rigid body-supporting portion 61. (However, this is the case when only one opening 65 for infusion use is present. Such a constitution is not limited if the opening 65 for infusion use is disposed in external parts of the above area).

In FIG. 2, the rigid body-supporting portion 61 is a wall shaped support part 62 so that the part 67 is a through hole 68 or the like formed in the wall shaped support part 62. In FIG. 3, the rigid body-supporting portion 61 is a column shaped support part 63 so that the part 67 is a space 69 between columns of the column shaped support part 63. In any case, the part 67 can allow the foaming agent 66 to reach all parts of the foamed molding 51 (i.e., so that the foamed layer 54 is formed continuosly between core material 53 and the skin layer formed of the skin material 52 and the soft insert component 43). Besides, the part 67 has quantities and sizes able to avoid bending of the rigid body portion 42 or the like by the above described compression force or restoration force or the like.

Figure 4:
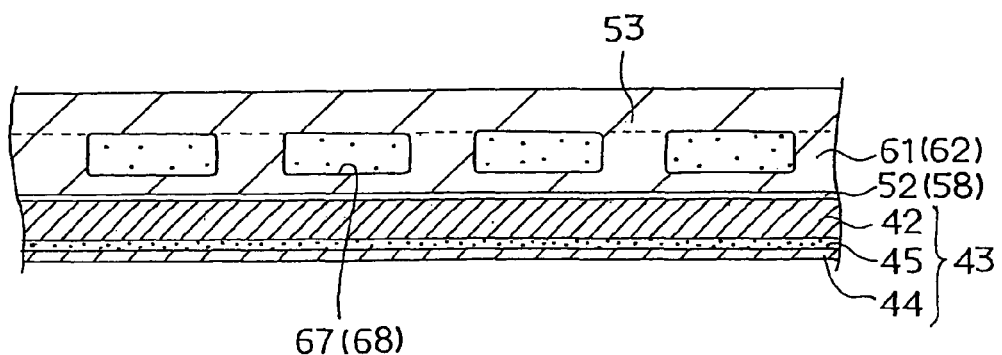
FIG. 4 is a cross sectional diagram illustrating a state in which a soft insert component of FIG. 2 is compressed.
Figure 5:
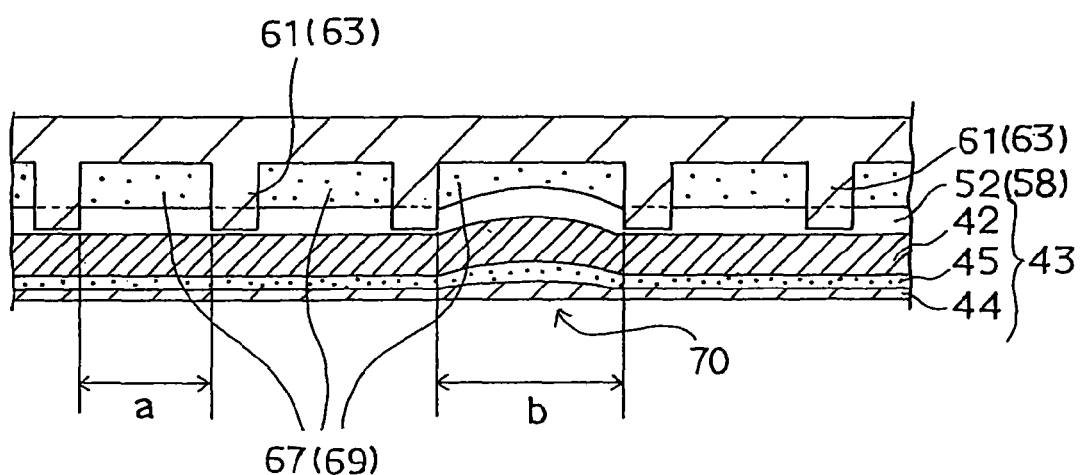
FIG. 5 is a cross sectional diagram illustrating a state in which a soft insert component of FIG. 3 is compressed.

For example, in the case of the wall shaped support part 62 of FIG. 2, because the support against the rigid body portion 42 becomes consecutive (line support), as illustrated in FIG. 4 in which the above described compression force and restoration force or the like are applied, there is little possibility that the rigid body portion 42 can be bent. Therefore, it is advantageous that the through hole 68 can be formed more abundantly and more widely. In contrast, in the case of the column shaped support part 63 of FIG. 3, because the support against the rigid body portion 42 is non-consecutive (point support), as illustrated in FIG. 5 in which the above described compression force and restoration force or the like are applied, there is a possibility that the rigid body portion 42 can be bent. Therefore, the space 69 (the part 67) between columns of the column shaped support part 63 is set to an interval not too narrow and not too broad. In this case, for example, an interval a is appropriate because no bending is generated. An interval b is inappropriate because a bending 70 is generated.

The foamed layer 54, as illustrated in FIG. 1, is formed continuously between the core material 53 and the skin layer formed of the skin material 52 and the soft insert component 43 by foam molding.

Furthermore, a groove part 73 for insertion use into which a marginal part of the skin material 52 can be inserted is disposed at the rigid body portion 42 of the soft insert component 43. In this case, the groove part 73 for insertion use is formed with a continual recess across a whole circumference on a surface of the rigid body portion 42 facing the rigid body-supporting portion 61. Therefore, a cross section of the rigid body portion 42 is approximately concave shaped. The groove part 73 for insertion use has a groove width approximately equal to the thickness of the skin material 52. The rigid body portion 42 has a dimensional width of about at least three times the thickness of the skin material 52. An insertion part 74 that can be inserted to the groove part 73 for insertion use is formed in correspondence. The insertion part 74 is obtained by bending a marginal part of the level surface part 58 of the skin material 52 close to the opening part 59 inward against the groove part 73 for insertion use for only an amount approximately equal to a depth of the recess of the groove part 73 for insertion use.

On the other hand, the rigid body-supporting portion 61 of the core material 53 includes a skin material holding section 76 that can hold the skin material 52 inserted into the groove part 73 for insertion use. The skin material holding section 76 is disposed in a tip of the rigid body-supporting portion 61. In this case, the tip of the rigid body-supporting portion 61 is shaped with a level difference. Hereby, one level is a direct holding section 77 that directly holds the rigid body portion 42 in a way that the rigid body portion 42 comes into contact with the direct holding section 77. Another level is a skin material holding section 76 (sandwich part) that together with the rigid body portion 42, sandwiches a portion of the skin material 52 situated in a vicinity of the insertion part 74.

The direct holding section 77 is configured to correspond to a part in the rigid body portion 42 not covered by the skin material 52 (a part of a side more internal to the groove part 73 for insertion use). The skin material holding section 76 is configured to correspond to a part in the rigid body portion 42 covered by the skin material 52 (a part of a side external to the groove part 73 for insertion use). The direct holding section 77 and the skin material holding section 76 are formed with a level difference approximately equal to the thickness of the skin material 52. In the case of the wall shaped support part 62 of FIG. 2, the support against the rigid body portion 42 is consecutive (line support). Hereby the direct holding section 77 situated internal to the above area serves as a first whole circumference seal part (sub-seal part). The skin material holding section 76 situated externally (not illustrated in FIG. 2) serves as a second whole circumference seal part (main seal part). Therefore, a strong two stage seal structure is obtained. In addition, from problems arising from dimensional precisions, the above described first seal part (between the direct holding section 77 and the rigid body portion 42) can be set so that a few space 79 generated due to fitting is formed (not particularly problematic because the second seal part is the main seal).

The foamed molding 41 with the soft insert component is molded as follows.

Figure 6:
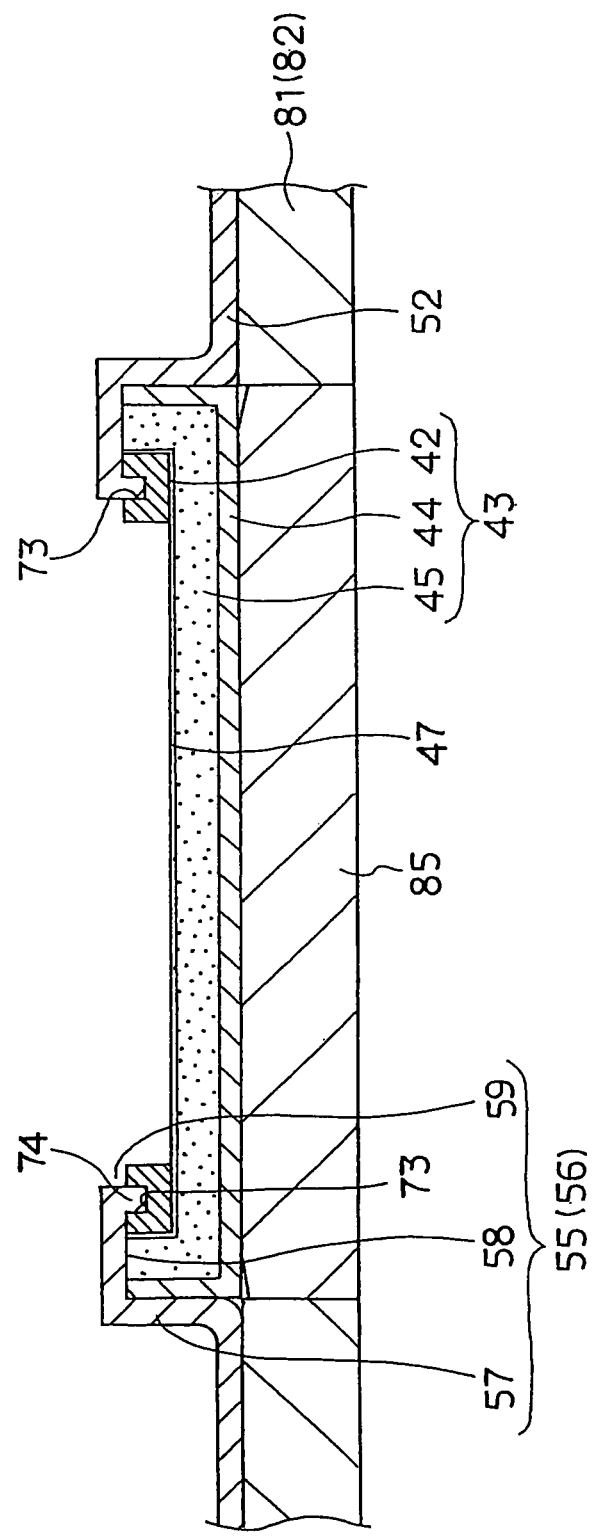
FIG. 6 is a cross sectional diagram that illustrates a step of a molding method of the foamed molding with the soft insert component illustrated in FIG. 1.
Figure 7:
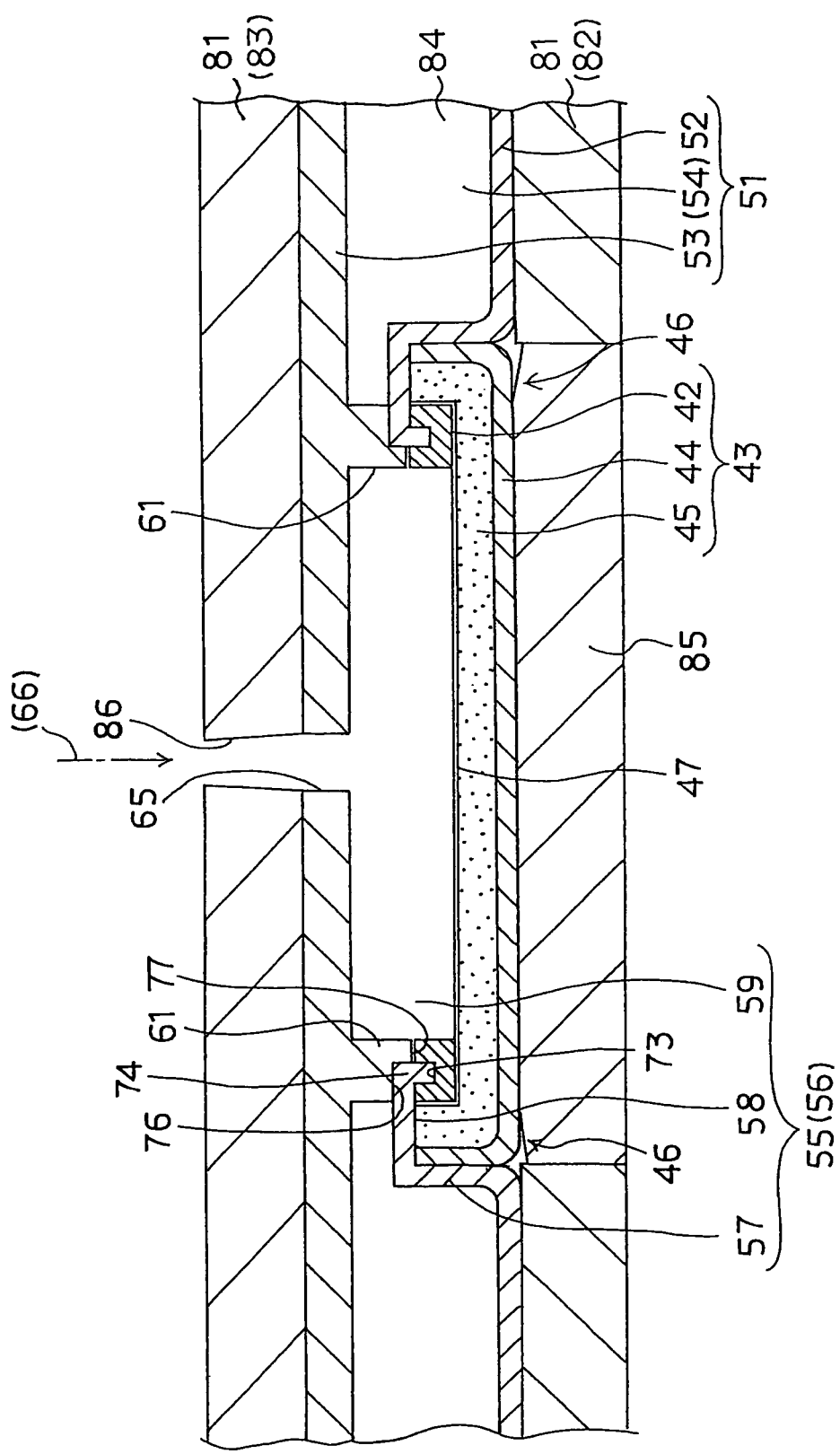
FIG. 7 is a cross sectional diagram that illustrates a step that continues from FIG. 6.

First, as illustrated in sequence in FIG. 6 and FIG. 7, a mold fastening step is performed. In the mold fastening step, the soft insert component 43, the skin material 52 and the core material 53 are set to a foam molding mold 81. Hereby the soft insert component 43 includes, in the vicinity of the marginal part of its reverse surface side, the rigid body portion 42. The skin material 52 includes the insert component fixing portion 55 onto which the soft insert component 43 can be fixed. The core material 53 includes the rigid body-supporting portion 61 that can support the rigid body portion 42 against the compression force applied to the soft insert component 43. The foam molding mold 81 is mold fastened under a state in which the rigid body portion 42 is supported by the rigid body-supporting portion 61 and the soft insert component 43 is fixed onto the insert component fixing portion 55 with a mutually approximately aligned surface.

That is, first, as illustrated in FIG. 6, the skin material 52 and the soft insert component 43 are set upside down onto an upper surface of a cavity mold 82 (lower mold) for foam molding that constitutes the foam molding mold 81. In this case, the skin material 52 and the soft insert component 43 can be separately set in the cavity mold 82 but work efficiency can be improved if the skin material 52 is preliminarily fixed onto the part 55 and then together set to the cavity mold 82. In this case, if the rigid body portion 42 has the groove part 73 for insertion use, the insertion part 74 of the skin material 52 is inserted to the groove part 73 for insertion use Next, as illustrated in FIG. 7, the core material 53 is set upside down in a lower surface of a core mold 83 (upper mold) for foam molding that constitutes the foam molding mold 81. Next, the cavity mold 82 and the core mold 83 are closed to form a foaming space 84 equal to the thickness of the foamed layer 54. The foaming space 84 should be formed between skin material 52 and the soft insert component 43 set in the cavity mold 82 and the core material 53 set in the core mold 83. In this case, if the tip part of the rigid body-supporting portion 61 of the core material 53 has the skin material holding section 76 and the direct holding section 77, the skin material 52 inserted in the groove part 73 for insertion use should be held by the skin material holding section 76 and the rigid body portion 42 should be held directly by the direct holding section 77 in a way that the rigid body portion 42 comes into contact with the direct holding section 77.

Hereby a slide mold 85 is disposed in the cavity mold 82 at a position corresponding to the soft insert component 43. The slide mold 85 compresses the soft insert component 43 in the thickness direction towards the core material 53. The slide mold 85 has a surface shape corresponding to that of the soft insert component 43.

In addition, an infusion opening 86 for allowing infusing of the foaming agent 66 (chemical) is formed on the core mold 83 at a position corresponding to the opening 65 of the core material 53 for infusion use.

Figure 8:
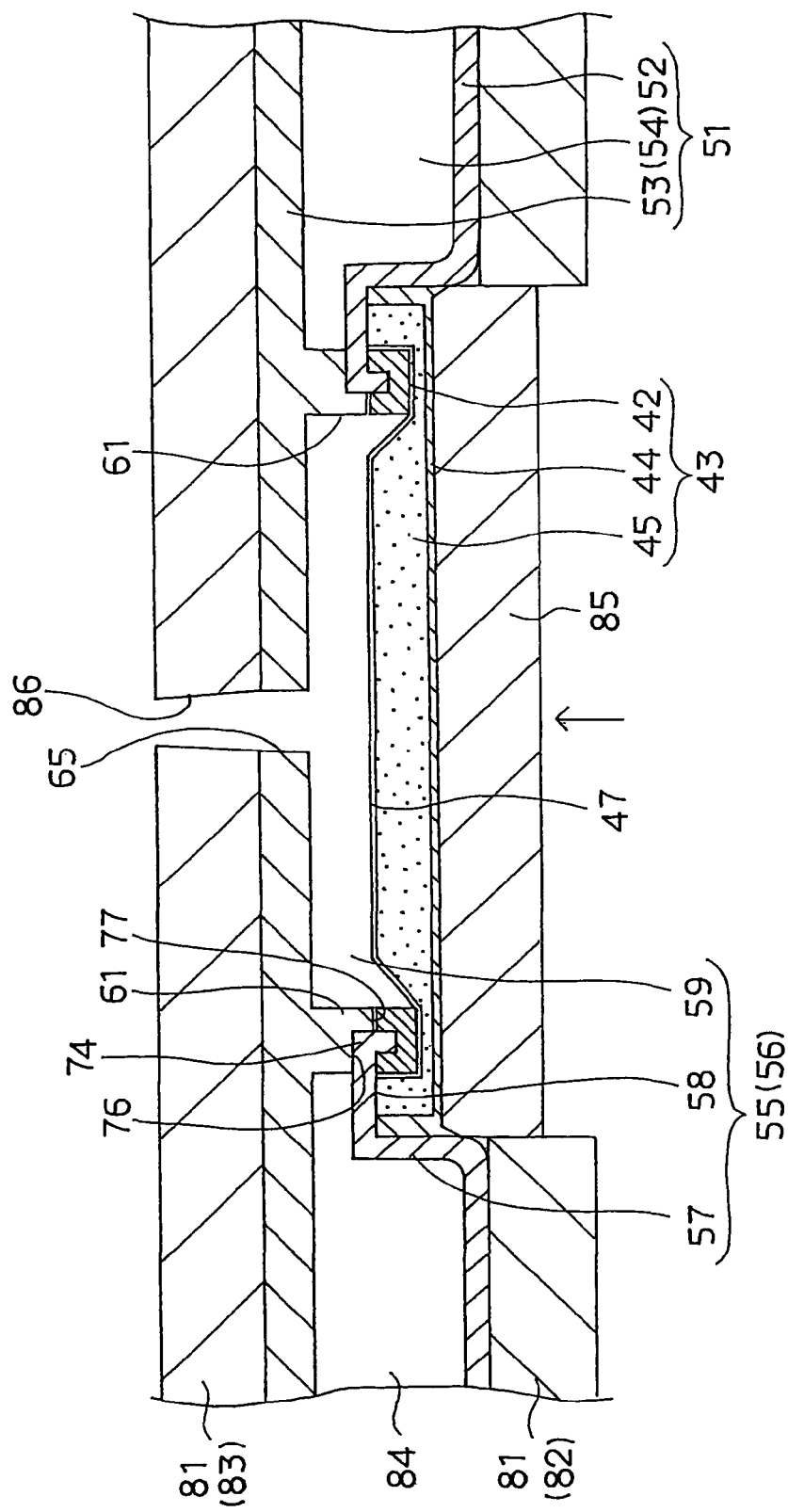
FIG. 8 is a cross sectional diagram that illustrates a step that continues from FIG. 7.

As illustrated in FIG. 8, a compression step is performed in which the slide mold 85 disposed in the foam molding mold 81 is moved in an upward direction within the figure so that the soft insert component 43 with its rigid body portion 42 supported by the rigid body-supporting portion 61 is compressed until it reaches a thickness almost compacted by a foam pressure of the foam agent 66. In this case, the soft material layer 45 is not compacted in its totality but is only partially compacted in the periphery of the rigid body portion 42 supported by the rigid body-supporting portion 61.

Figure 9:
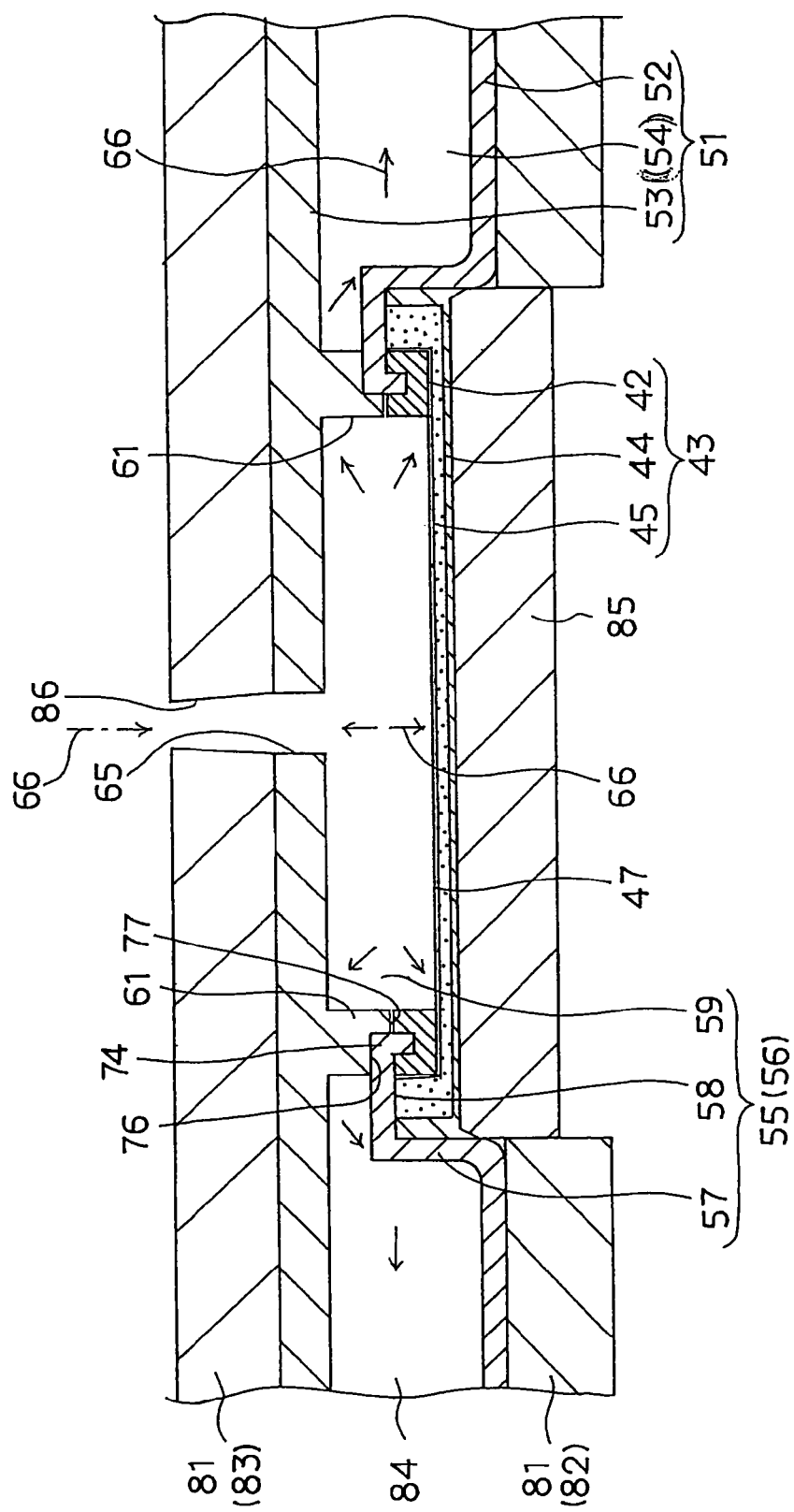
FIG. 9 is a cross sectional diagram that illustrates a step that continues from FIG. 8.

As illustrated in FIG. 9, the foaming agent 66 is infused into the foaming space 84 formed between the core material 53 and the skin layer formed of the skin material 52 and the soft insert component 43. In this foaming step in which the foaming agent 66 begins foam formation, a part of the soft material layer 45 situated between the two rigid body portions 42 or the like is compacted by the foam pressure.

In addition, the compression step can be performed before infusing the foaming agent 66 in the foaming step.

In addition, the compression step can be performed at the beginning of infusing the foaming agent 66 in the foaming step or during infusion of the foaming agent.

The compression step can also be performed after finishing the infusion of the foaming agent 66 in the foaming step until foam formation of the foaming agent 66 is completed in the foaming space 84.

Figure 10:
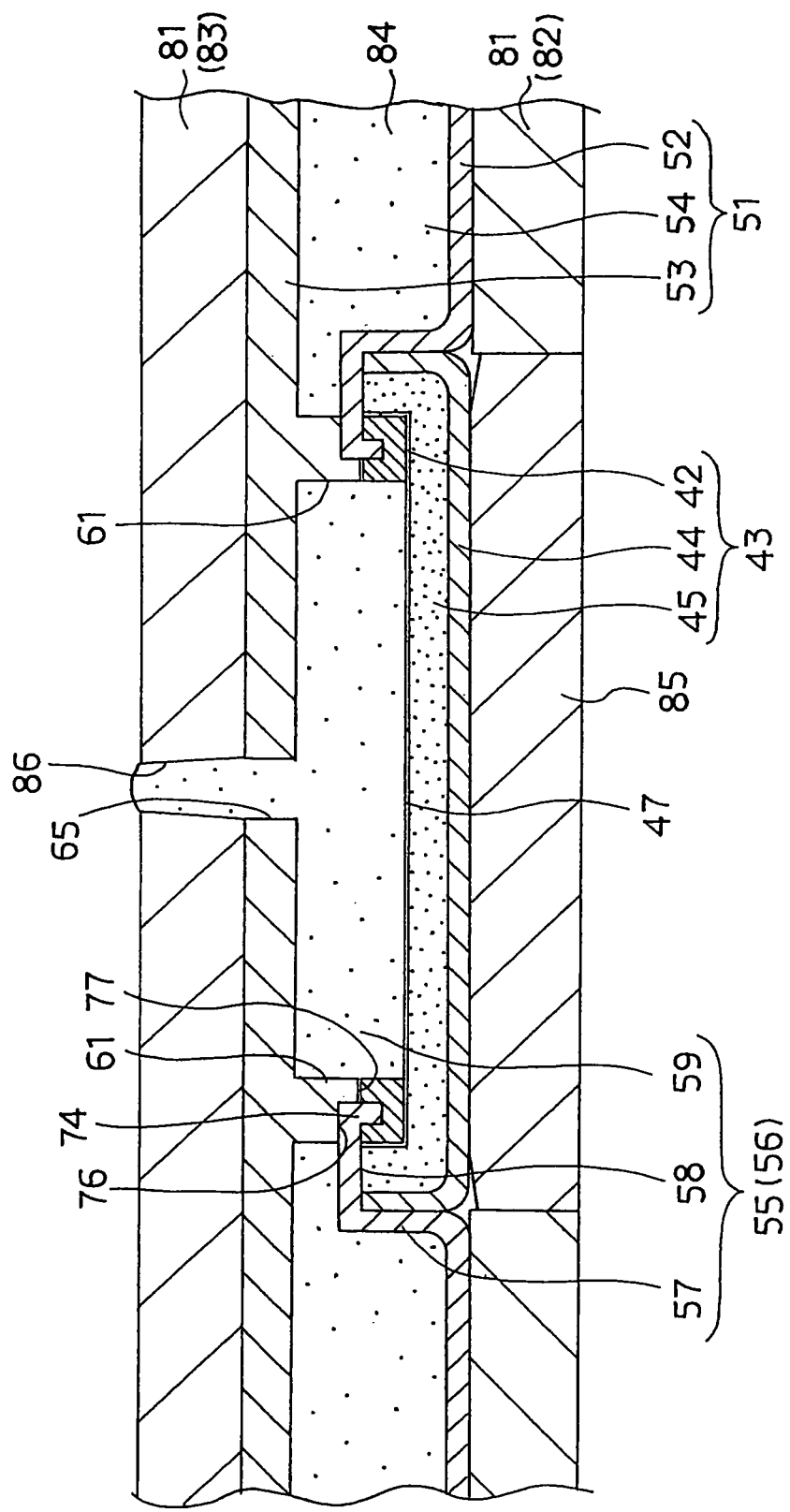
FIG. 10 is a cross sectional diagram that illustrates a step that continues from FIG. 9.
Figure 11:
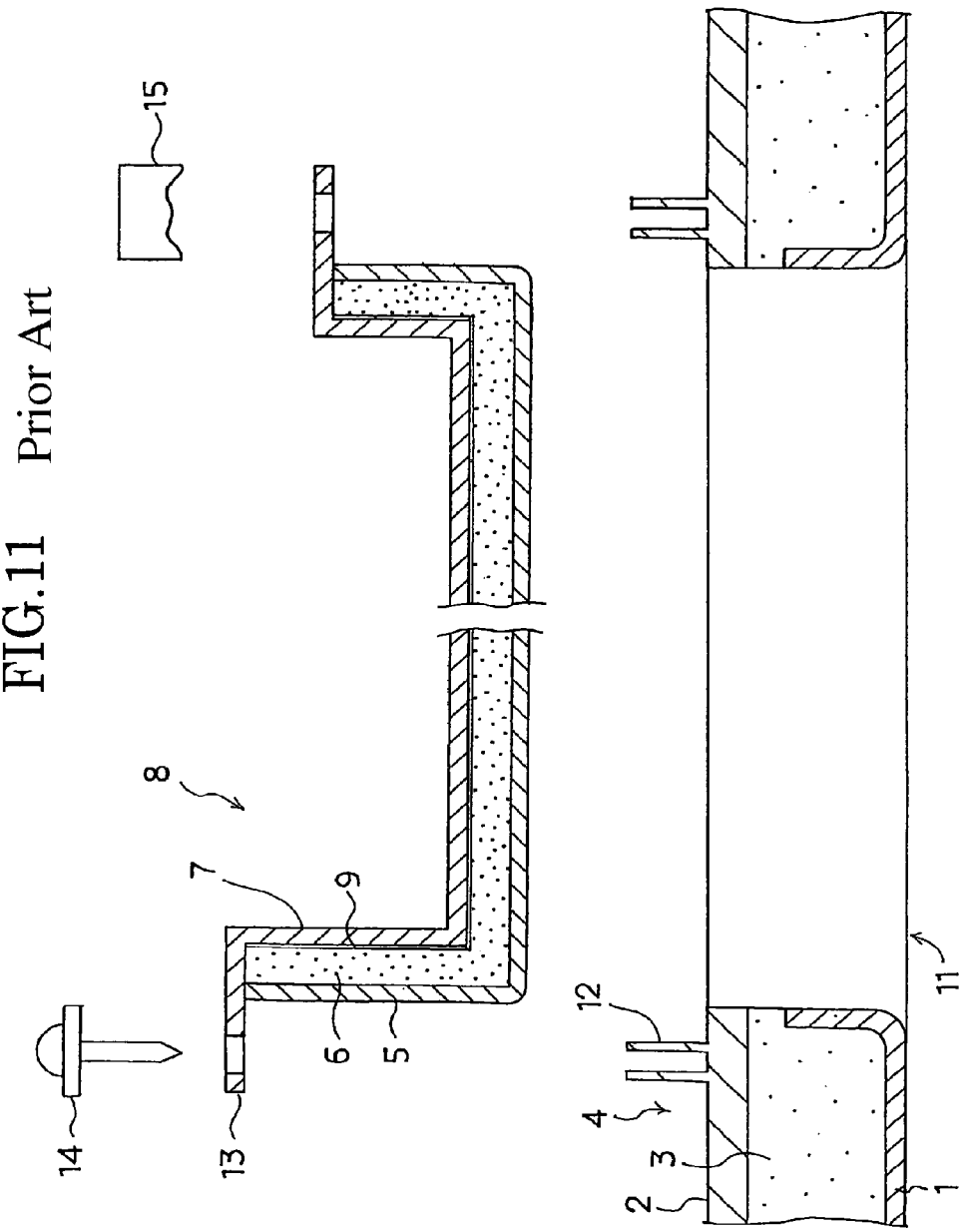
FIG. 11 is a cross sectional diagram of a conventional foamed molding that illustrates a state in which a soft insert component is embedded.
Figure 12:
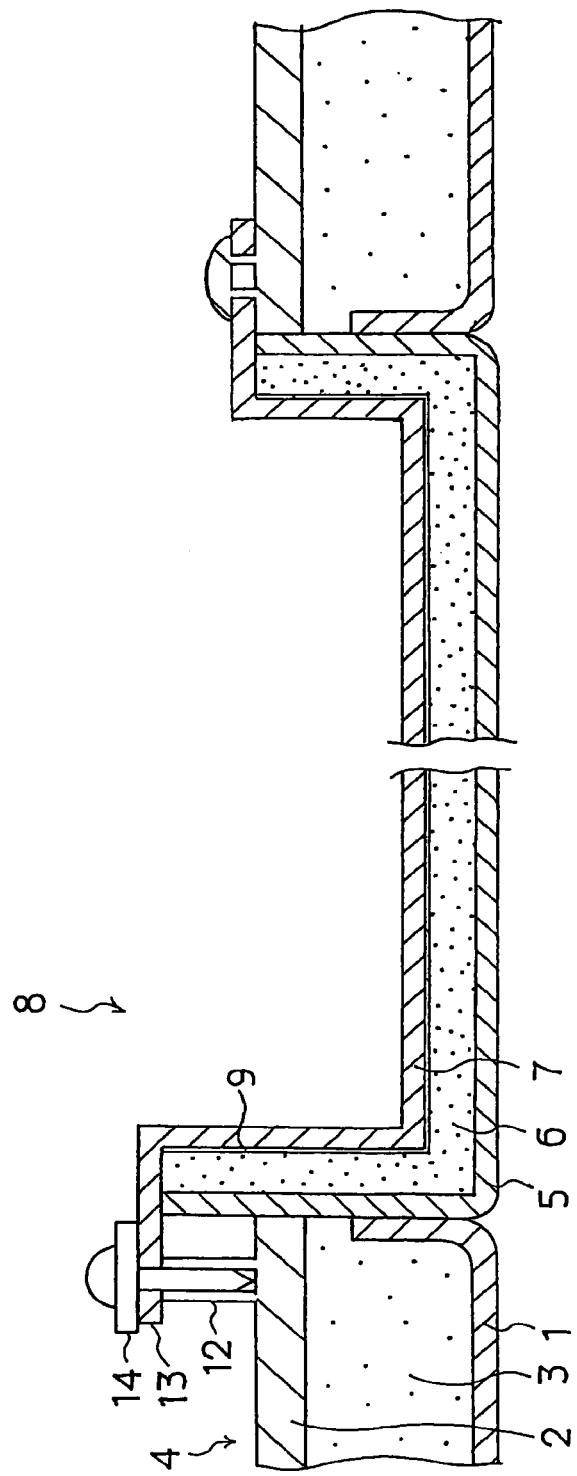
FIG. 12 is a cross sectional diagram of a foamed molding manufactured by the molding method illustrated in FIG. 11.
Figure 13:
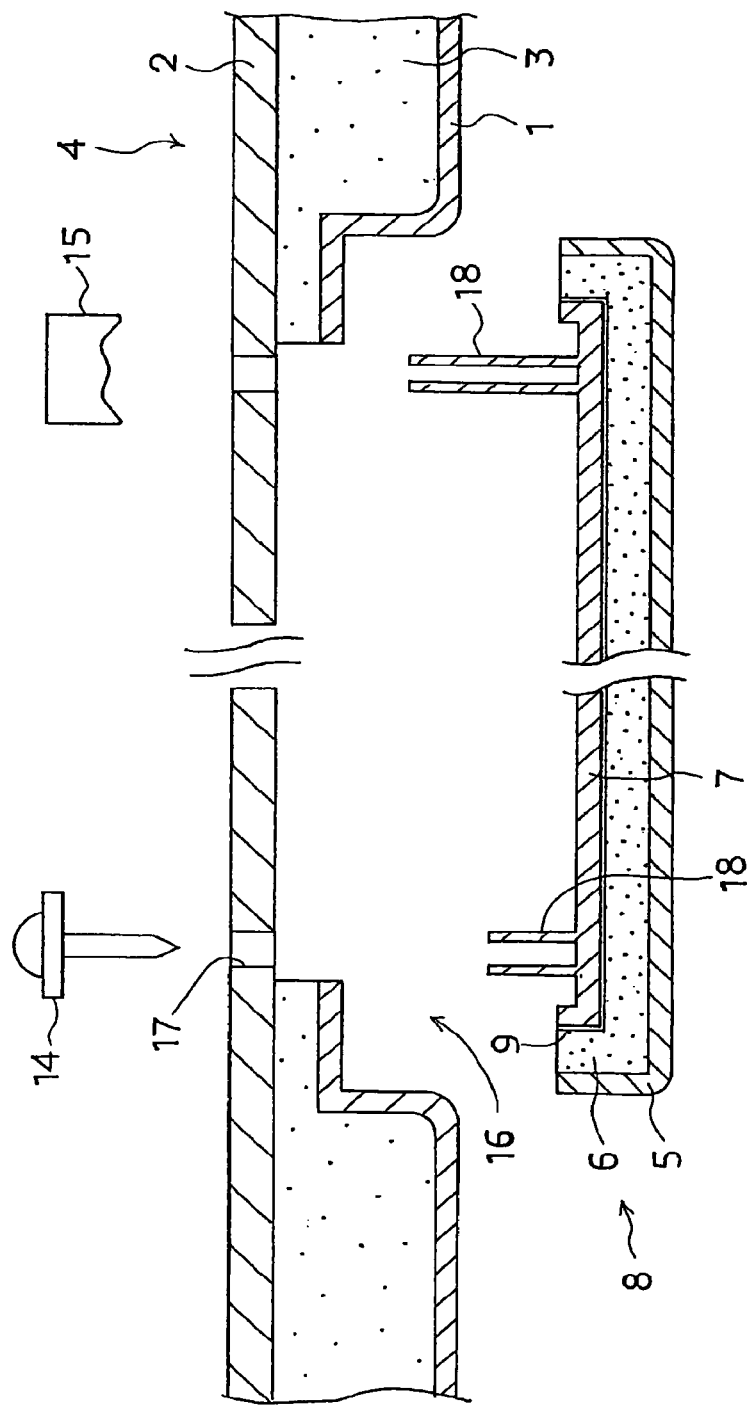
FIG. 13 is a cross sectional diagram of another conventional foamed molding that illustrates a state in which a soft insert component is embedded.
Figure 14:
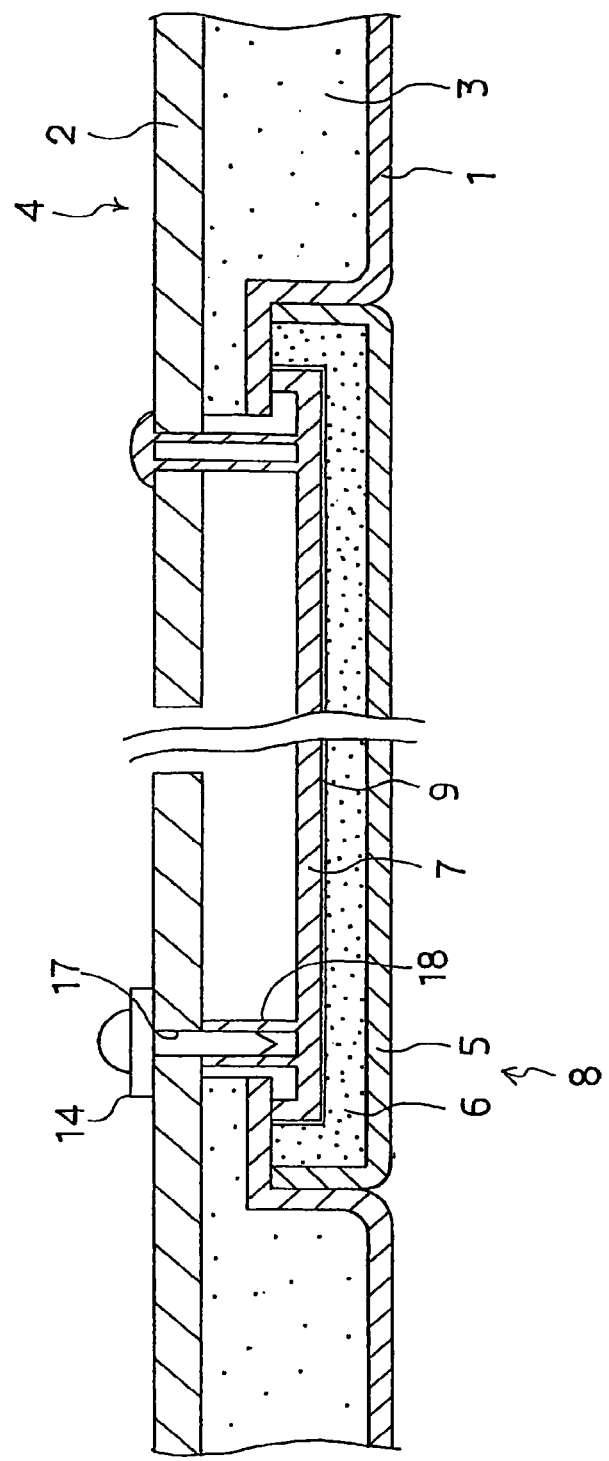
FIG. 14 is a cross sectional diagram of the another conventional foamed molding manufactured by the molding method illustrated in FIG. 13.
Figure 15:
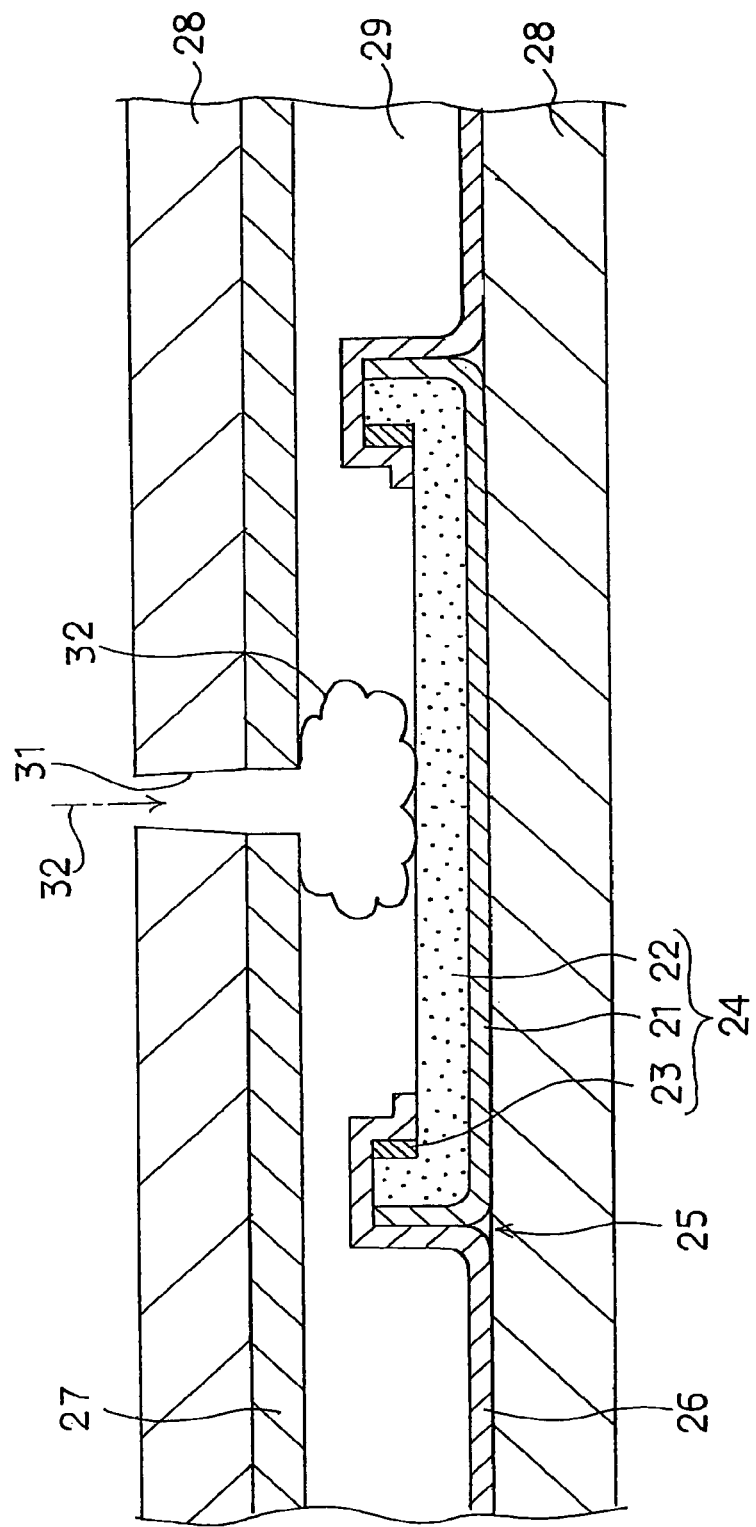
FIG. 15 is a cross sectional diagram that illustrates a step of a molding method of a foamed molding with a soft insert component.
Figure 16:
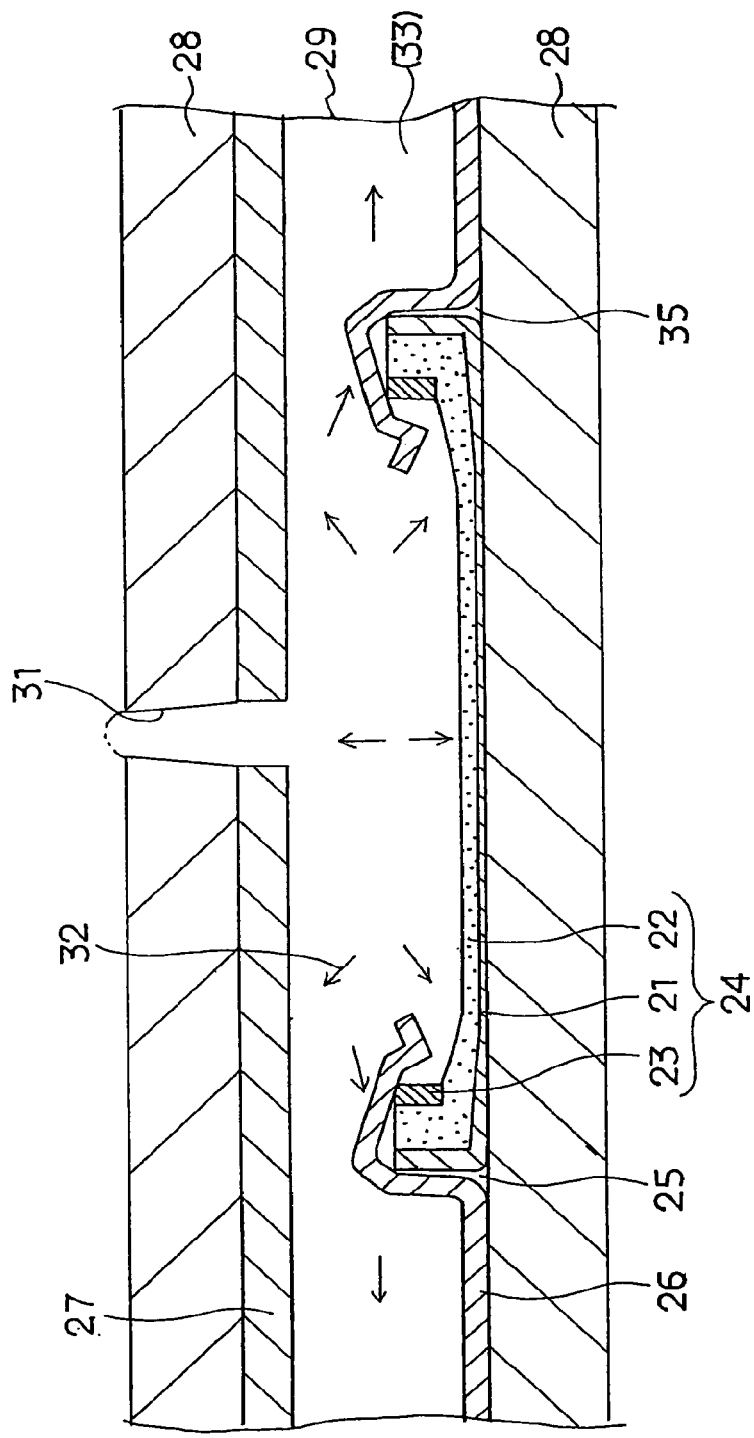
FIG. 16 is a cross sectional diagram that illustrates a step that continues from FIG. 15.
Figure 17:
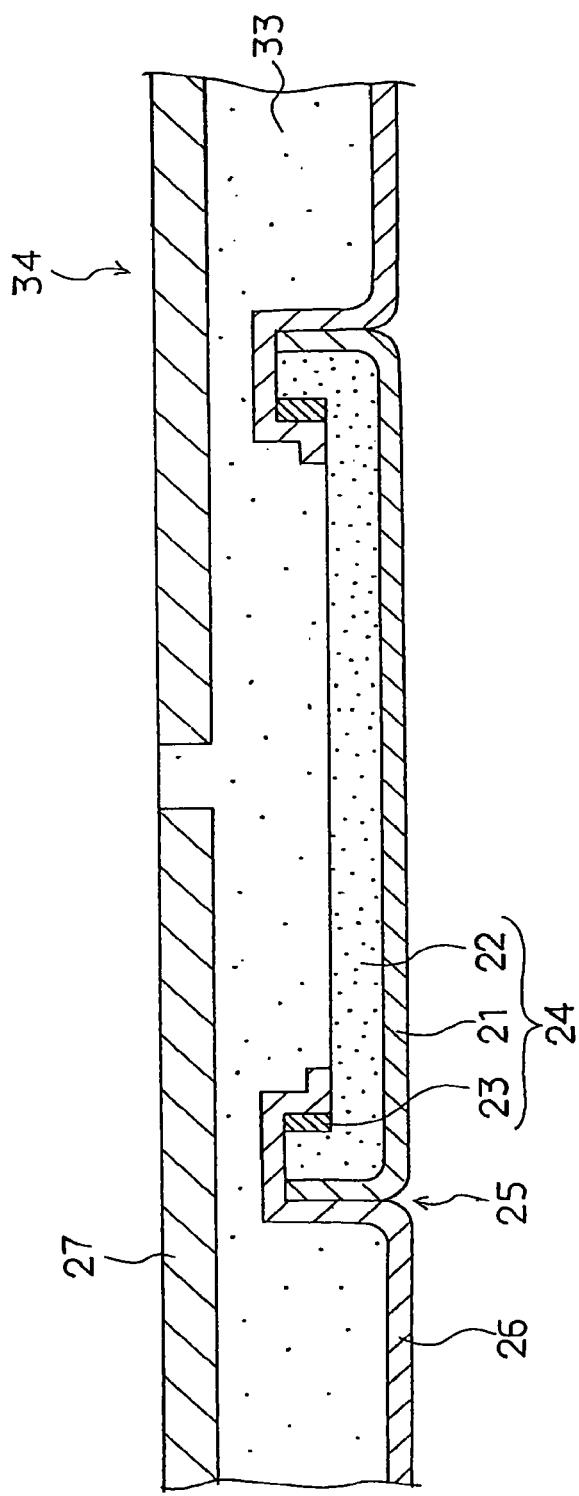
FIG. 17 is a cross sectional diagram of the foamed molding with the soft insert component that should be obtained by FIG. 16.
Figure 18:
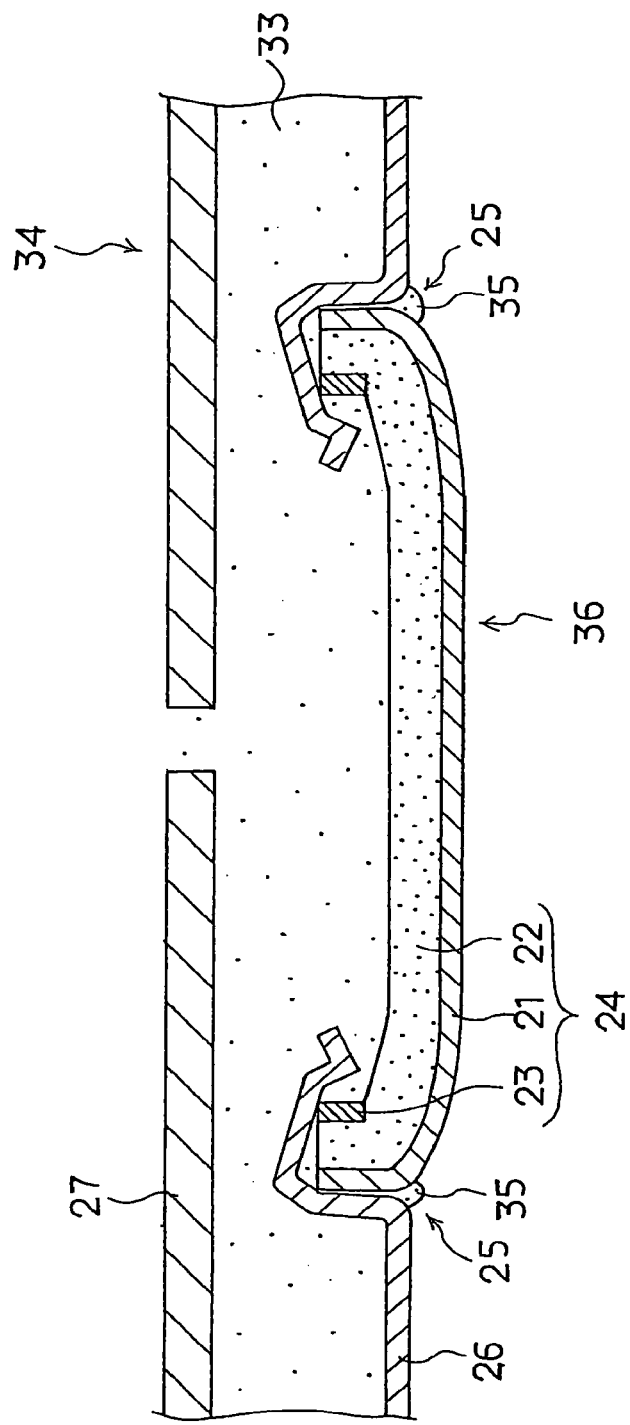
FIG. 18 is a cross sectional diagram of a foamed molding with a soft insert component that is actually obtained by FIG. 16.

Finally, as illustrated in FIG. 10, the slide mold 85 is withdrawn after the foamed layer 54 becomes hardened. The slide mold 85 is then mold released. The compressed soft insert component 43 is then restored. By such a mold releasing step, the foamed molding 41 with the soft insert component 43 as illustrated in FIG. 1 is molded.

According to the present embodiment, the soft insert component 43 has, in the vicinity of the marginal part of its reverse surface side, the rigid body portion 42. The soft insert component 43 is insert molded in integration to the foamed molding 51. The foamed molding 51 includes a triple layered structure having the skin material 52, the core material 53 and the foamed layer 54. The skin material 52 includes the insert component fixing portion 55 onto which the soft insert component 43 can be fixed. The core material 53 includes a rigid body-supporting portion 61 able to support the rigid body portion 42 while resisting against the compression force applied to the soft insert component 43 during foam molding. The foamed layer 54 is shaped between the core material 53, the skin material 52 and the soft insert component 43 so that sticking out of the foamed layer 54 from between the skin material 52 and the soft insert component 43 is not generated. Therefore, the foamed molding 41 with the soft insert component of a good external fitting quality can be formed in which the skin material 52 and the soft insert component 43 maintain a mutually approximately aligned surface (without surface difference or irregularity) to form a skin layer.

In addition, the groove part 73 for insertion use into which the marginal part corresponding to the skin material 52 can be inserted is disposed at the rigid body portion 42 of the soft insert component 43. In addition, the rigid body-supporting portion 61 of the core material 53 includes the skin material holding section 76 that can hold the skin material 52 inserted into the groove part 73 for insertion use. Therefore, a structure can be obtained in which an entrance part between the skin material 52 and the soft insert component 43 can be further certainly sealed.

The foamed molding 41 with the soft insert component includes the soft insert component 43 having, in the vicinity of the marginal part of its reverse surface side, the rigid body portion 42, the skin material 52 having the insert component fixing portion 55 onto which the soft insert component 43 can be fixed and the core material 53 having the rigid body-supporting portion 61 able to support the rigid body portion 42 while resisting against the compression force applied to the soft insert component 43. The soft insert component 43, the skin material 52 and the core material 53 are set to the foam molding mold 81 to be mold fastened under a state in which the rigid body portion 42 is supported by the rigid body-supporting portion 61 and the soft insert component 43 is fixed onto the insert component fixing portion 55 with a mutually approximately aligned surface formed between the two members. In addition to the above described mold fastening step, the present embodiment also includes a compression step of moving a slide 85 of the foam molding mold 81 to compress the soft insert component 43 having the rigid body portion 42 supported by the rigid body-supporting portion 61 until the soft insert component 43 reaches a thickness almost compacted by a foam pressure of a foaming agent 66, a foaming step that generates a foamed layer 54 by infusing the foaming agent 66 into the foaming space 84 formed between the core material 53 and a skin layer formed of the skin material 52 and the soft insert component 43 and a mold releasing step that withdraws the slide mold 85 after the foamed layer 54 is hardened and mold releases the slide mold 85 so that the compressed soft insert component 43 can be restored and the foamed molding 41 with the soft insert component can be molded. In such a way, molding of the foamed molding 41 with the soft insert component having a good external fitting quality becomes possible in which the skin material 52 and the soft insert component 43 maintain an approximately aligned surface (without surface difference or irregularity) and sticking out of the foamed layer 54 from between the skin material 52 and the soft insert component 43 is not generated. In addition, in the compression step, the compressed quantity (compression quantity against the soft insert component 43) of the slide mold 85 can be adjusted for possible control of surface difference and irregularity.

In addition, the compression step can be preformed before infusing the foaming agent 66 in the foaming step so that the compression step can be performed certainly.

In addition, the compression step can be performed at a beginning of infusing the foaming agent 66 in the foaming step or during infusion of the foaming agent so that time required to the compression step can be shortened and production efficiency can be improved.

The compression step can also be performed after finishing the infusion of the foaming agent 66 in the foaming step until foam formation of the foaming agent 66 is completed in the foaming space 84 so that time required for the compression step can be shortened and production efficiency can be improved. In addition, because the foaming agent 66 is in the form of liquid, a force sufficient for the foaming agent 66 to permeate into spaces or the like is not at work. Therefore, if the compression step is performed before the foam pressure is exerted (before the foaming space 84 is filled), sticking out of the foaming agent 66 from spaces or the like can be sufficiently prevented.

According to the present invention, the soft insert component has, in the vicinity of the marginal part of its reverse surface side, the rigid body portion. The soft insert component is insert molded in integration to the foamed molding. The foamed molding includes a triple layered structure having the skin material, the core material and the foamed layer. The skin material includes the insert component fixing portion onto which the soft insert component can be fixed. The core material includes a rigid body-supporting portion able to support the rigid body portion against the compression force applied to the soft insert component during foam molding. The foamed layer is shaped between the core material, the skin material and the soft insert component so that sticking out of the foamed layer from between the skin material and the soft insert component is not generated. Therefore, the foamed molding with the soft insert component of a good external fitting quality can be formed in which the skin material and the soft insert component approximately maintain a mutually aligned surface (without surface difference or irregularity).

The groove part for insertion use into which the marginal part corresponding to the skin material can be inserted is disposed at the rigid body portion of the soft insert component. In addition, the rigid body-supporting portion of the core material includes the skin material holding section that can hold the skin material inserted into the groove part for insertion use. Therefore, a structure can be obtained in which an entrance part between the skin material and the soft insert component can be further certainly sealed.

The foamed molding with the soft insert component includes the soft insert component having, in the vicinity of the marginal part of its reverse surface side, the rigid body portion, the skin material having the insert component fixing portion onto which the soft insert component can be fixed and the core material having the rigid body-supporting portion able to support the rigid body portion while resisting against the compression force applied to the soft insert component. The soft insert component, the skin material and the core material are set to the foam molding mold to be mold fastened under a state in which the rigid body portion is supported by the rigid body-supporting portion and the soft insert component is fixed onto the insert component fixing portion with a mutually approximately aligned surface formed between the two members. In addition to the above described mold setting step, the present invention also includes a compression step of moving a slide of the foam molding mold to compress the soft insert component having the rigid body portion supported by the rigid body-supporting portion until the soft insert component reaches a thickness almost crushed by a foam pressure of a foaming agent, a foaming step that generates a foamed layer by infusing a foaming agent into a foaming space formed between the core material, the skin material and the soft insert component and a mold release step that withdraws the slide mold after the foamed layer is hardened and mold releases the slide mold so that the crushed soft insert component can be restored and the foamed molding with the soft insert component can be molded. In such a way, molding of the foamed molding with the soft insert component having a good external fitting quality becomes possible in which the skin material and the soft insert component maintain an approximately aligned surface (without surface difference or irregularity) and sticking out of the foamed layer from between the skin material and the soft insert component is not generated. In addition, in the compression step, the compressed quantity (compression quantity against the soft insert component) of the slide mold can be adjusted for possible control of surface difference and irregularity.

In addition, the compression step can be preformed before infusing the foaming agent 66 in the foaming step so that the compression step can be performed reliably.

In addition, the compression step can be performed at a beginning of the infusing the foaming agent 66 in the foaming step or during infusion of the foaming agent so that time required for the compression step can be shortened and production efficiency can be improved.

The compression step can also be performed after finishing the infusion of the foaming agent 66 in the foaming step until foam formation of the foaming material is completed so that time required to the compression step can be shortened and production efficiency can be improved. In addition, because the foaming agent 66 is in the form of liquid, a force big enough for the foaming agent 66 to permeate into spaces or the like is not at work. Therefore, if the compression step is performed before the foam pressure is exerted (before the foaming space 84 is filled), sticking out of the foaming agent 66 from spaces or the like can be sufficiently prevented.

The preferred embodiment of the present invention is described in detail above with reference to the drawings but the present invention is not limited to the above embodiment. It is to be noted that various modifications and changes can be made to the above embodiment.

The invention claimed is:

1. A foamed molding comprising:
a foamed molding body portion having a triple-layered structure including a skin material forming a first surface of said foamed molding body portion, a core material forming a second surface of said foamed molding body portion opposite said first surface, and a foamed layer between said skin material and said core material; and
a soft insert component insert-molded integrally with said foamed molding body portion, said soft insert component including a skin material part arranged substantially co-planar with said skin material of said foamed molding body portion, a rigid body portion at a position adjacent to said core material of said foamed molding body portion, and a soft material layer between said rigid body portion and said skin material part, said rigid body portion having a groove formed therein;
wherein said skin material of said foamed molding body portion has an insert component fixing portion holding said soft insert component, said insert component fixing portion of said skin material having a facing end flange part inserted within said groove of said rigid body portion of said soft insert component so that said insert component fixing portion engages with said rigid body portion;
wherein said core material of said foamed molding body portion has a rigid body-supporting portion protruding from an inner surface of said core material facing said foamed layer so as to support said engagement of said insert component fixing portion of said skin material and said rigid body portion of said soft insert component against a compression force applied to said soft insert component during foam molding; and
wherein said foamed layer is arranged continuously between said core material of said foamed molding body portion and said skin material of said foamed molding body portion, and said foamed layer is arranged continuously between said core material of said foamed molding body portion and said soft insert component.

2. The foamed molding of claim 1, wherein said rigid body portion of said soft insert component is configured to be supported and constrained by said rigid body-supporting portion and said insert component fixing portion of said skin material of said foamed molding body portion; and
wherein said rigid body-supporting portion of said core material has a skin material holding section engaging and holding said facing end flange part of said skin material inserted into said groove part of said rigid body portion of said soft insert component.

3. The foamed molding of claim 1, wherein said rigid body-supporting portion includes at least one opening for allowing a foaming agent to pass therethrough.

4. The foamed molding of claim 1, wherein said soft insert component further includes a barrier layer, said rigid body portion being located against an inner surface of said barrier layer facing said foamed layer at a peripheral portion of said soft insert component.

5. The foamed molding of claim 1, wherein said foamed molding body portion and said soft insert component are configured such that an outer surface of said skin material of said foamed molding body portion and an outer surface of said soft insert component are substantially co-planar.

6. The foamed molding of claim 1, wherein said rigid body portion of said soft insert component and said core material and skin material of said foamed molding body portion are mutually engaged through said insert component fixing portion to obtain a two stage seal structure having a sub-seal part and a main seal part.

\* \* \* \* \*